(12) United States Patent
Conte et al.

(10) Patent No.: US 10,253,704 B2
(45) Date of Patent: Apr. 9, 2019

(54) METHOD OF CONTROLLING THE OPERATION OF AN AIR CHARGING SYSTEM OF AN INTERNAL COMBUSTION ENGINE

(71) Applicant: GM GLOBAL TECHNOLOGY OPERATIONS LLC, Detroit, MI (US)

(72) Inventors: Giuseppe Conte, Turin (IT); Vincenzo Alfieri, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 200 days.

(21) Appl. No.: 14/711,382

(22) Filed: May 13, 2015

(65) Prior Publication Data
US 2015/0345412 A1  Dec. 3, 2015

(30) Foreign Application Priority Data
May 27, 2014  (GB) .................... 1409356.1

(51) Int. Cl.
  *F02D 41/00* (2006.01)
  *F02D 41/14* (2006.01)
  (Continued)

(52) U.S. Cl.
  CPC .......... *F02D 41/0007* (2013.01); *F02B 37/24* (2013.01); *F02D 11/105* (2013.01);
  (Continued)

(58) Field of Classification Search
  CPC ...... F02D 21/08; F02D 37/00; F02D 41/0002; F02D 41/0007; F02D 41/0047;
  (Continued)

(56) References Cited

U.S. PATENT DOCUMENTS

| | | | |
|---|---|---|---|
| 7,025,040 B2 * | 4/2006 | Hoshino | F02D 11/105 |
| | | | 123/399 |
| 7,031,824 B2 * | 4/2006 | Gangopadhyay | F02D 41/0052 |
| | | | 123/684 |

(Continued)

OTHER PUBLICATIONS

Jung, H., Jin, H., Choi, S., and Ko, M., "Modeling and Control of Single Turbocharger with High Pressure Exhaust Gas Recirculation Diesel Engine," SAE Technical Paper 2013-01-2649, 2013, doi:10.4271/2013-01-2649. http://papers.sae.org/2013-01-2649/.*

(Continued)

*Primary Examiner* — Jacob M Amick
*Assistant Examiner* — Michael A Kessler
(74) *Attorney, Agent, or Firm* — Lorenz & Kopf, LLP (57) ABSTRACT

A method of controlling the operation of an air charging system is disclosed. A plurality of output parameters of the air charging system are monitored. An error between each one of the monitored output parameters and a target value thereof is calculated. Each one of the calculated errors is applied to a linear controller that yields a virtual input which is used to calculate a plurality of input parameters for the air charging system. Each one of the input parameters is used to determine the position of a corresponding actuator of the air charging system and operate of the actuators according to the determined position thereof. The inputs parameters are calculated with a non-linear mathematical model of the air charging system configured such that each one of the virtual inputs is in a linear relation with only one of the output parameters.

15 Claims, 3 Drawing Sheets

(51) Int. Cl.
*F02D 41/18* (2006.01)
*F02B 37/24* (2006.01)
*F02D 11/10* (2006.01)
*F02M 26/05* (2016.01)

(52) U.S. Cl.
CPC ..... *F02D 41/0052* (2013.01); *F02D 41/0072* (2013.01); *F02D 41/0077* (2013.01); *F02D 41/18* (2013.01); *F02M 26/05* (2016.02); *F02D 41/144* (2013.01); *F02D 41/1448* (2013.01); *F02D 41/1454* (2013.01); *F02D 2041/0017* (2013.01); *F02D 2041/143* (2013.01); *F02D 2041/1409* (2013.01); *F02D 2041/1415* (2013.01); *F02D 2041/1418* (2013.01); *F02D 2041/1429* (2013.01); *F02D 2200/0402* (2013.01); *F02D 2200/0406* (2013.01); *F02D 2200/0414* (2013.01); *Y02T 10/144* (2013.01); *Y02T 10/42* (2013.01); *Y02T 10/47* (2013.01)

(58) Field of Classification Search
CPC .. F02D 41/005; F02D 41/052; F02D 41/0072; F02D 41/0077; F02D 41/18; F02D 41/1401; F02D 41/1446; F02D 41/1448; F02D 2021/083; F02D 2041/001; F02D 2041/0017; F02D 2041/002; F02D 2041/1415; F02D 2041/1418; F02D 2041/143; F02D 2041/1433; F02D 2041/0067; F02D 2041/1409; F02D 2041/1429; F02D 2200/0402; F02D 2200/0406; F02D 2200/0408; F02D 2200/0414; Y02T 10/42; Y02T 10/47; Y02T 10/50

USPC ................. 701/102, 108; 123/679, 560–566; 60/598, 600, 602, 603, 611
See application file for complete search history.

(56) References Cited

U.S. PATENT DOCUMENTS

| | | | | |
|---|---|---|---|---|
| 7,389,173 | B1* | 6/2008 | Wang | F02B 37/22 60/602 |
| 7,512,479 | B1* | 3/2009 | Wang | F02M 26/47 123/568.21 |
| 7,784,451 | B2* | 8/2010 | Chi | F02D 41/0072 123/568.19 |
| 8,108,123 | B2* | 1/2012 | Sarlashkar | F02D 41/1403 123/434 |
| 8,640,679 | B2* | 2/2014 | Wang | F02D 41/0007 123/568.21 |
| 2009/0007888 | A1 | 1/2009 | Sarlashkar et al. | |
| 2010/0292907 | A1 | 11/2010 | Sarlashkar et al. | |
| 2011/0041493 | A1 | 2/2011 | Doering et al. | |
| 2012/0291534 | A1 | 11/2012 | Wang et al. | |
| 2013/0074496 | A1 | 3/2013 | Chi et al. | |
| 2014/0060506 | A1* | 3/2014 | Shaver | F02D 13/0226 123/672 |
| 2015/0345412 | A1 | 12/2015 | Conte et al. | |

OTHER PUBLICATIONS

Thermodynamics—Basic Concepts—Durham College. Aug. 3, 2011. p. 2. Obtained from the internet on Jul. 25, 2017.*
Sliding-Mode Control. M. Sami Fadali, Professor EBME University of Nevada, Reno. Website: https://wolfweb.unr.edu/homepage/fadali/EE776/Sliding-Mode%20Control.pdf. Accessed Dec. 14, 2017.*
Great Britain Patent Office, Great Britain Search Report for Great Britain Application No. 1409356.1, dated Dec. 19, 2014.

* cited by examiner

METHOD OF CONTROLLING THE OPERATION OF AN AIR CHARGING SYSTEM OF AN INTERNAL COMBUSTION ENGINE

CROSS-REFERENCE TO RELATED APPLICATION

This application claims priority to Great Britain Patent Application No. 1409356.1, filed May 27, 2014, which is incorporated herein by reference in its entirety.

TECHNICAL FIELD

The present disclosure pertains to a method of controlling the operation of an air charging system of an internal combustion engine, for instance an internal combustion engine of a motor vehicle.

BACKGROUND

An internal combustion engine may be equipped with an air charging system for supplying air into the combustion chambers. The air charging system conventionally includes an intake pipe that provides air from the ambient environment to an intake manifold in fluid communication with each of the combustion chambers through at least one intake port. An intake valve is disposed in the intake pipe with an actuator arranged to move a valve member to regulate the flow of air towards the intake manifold.

The air charging system may also include a turbocharger to force the air into the intake manifold. The turbocharger generally includes a compressor rotationally coupled to a turbine. The compressor is disposed in the intake pipe. The turbine is disposed in an exhaust pipe in fluid communication with an exhaust manifold. In this way, the turbine rotates by receiving exhaust gasses from the exhaust manifold and drives the compressor to increase rotation and the pressure and temperature of the air in the intake pipe and manifold. An intercooler may be disposed in the intake pipe, between the compressor and the intake manifold, to reduce the temperature of the air. The turbine may be a variable geometry turbine (VGT) with an actuator arranged to move the turbine vanes to alter the flow of the exhaust gasses, thereby regulating the rotational speed of the compressor.

The air charging system may further include an exhaust gas recirculation (EGR) pipe coupled between the exhaust manifold and the intake manifold to recirculate a portion of the exhaust gasses back to the combustion chambers, in order to reduce the nitrogen oxides ($NO_x$) emissions. An EGR valve is generally disposed in the EGR pipe with an actuator arranged to move the valve member to regulate the flow of exhaust gasses towards the intake manifold.

During the operation of the engine, the EGR valve actuator, the VGT actuator and the intake valve actuator are generally used to regulate a number of output parameters of the air charging system, particularly the pressure inside the intake manifold, the oxygen concentration inside the intake manifold and the pressure inside the exhaust manifold, in order to vary the air composition and the boost level according to the performance and emissions requirements.

To perform this function, these actuators are controlled by an electronic control unit (ECU) according to separated and uncoordinated control strategies, which are activated and deactivated depending on the current engine operating point, namely on the current values of the engine speed and of the engine load. By way of example, if the current engine operating point is within a region of engine speed and engine load values that requires low pollutant emissions, then the EGR valve actuator is generally controlled with a dedicated closed loop control strategy whereas the VGT actuator is controlled with a simple open loop control strategy. If conversely the current engine operating point is within a region of engine speed and engine load values that requires maximum engine performances, then the EGR valve actuator is controlled with a simple open loop strategy and the VGT actuator is controlled with a dedicated closed loop strategy.

However, the effects generated on the output parameters of the air charging system by the EGR valve actuator, the VGT actuator and the intake valve actuator are generally strictly interdependent and have mutual interactions. As a consequence, the separated and uncoordinated control approach that is conventionally implemented may sometimes be afflicted with low accuracy, especially during fast transients. Moreover, this control approach needs a vast calibration activity to guarantee an acceptable trade-off between engine performances and pollutant emissions in any operating conditions.

SUMMARY

In accordance with the present disclosure a coordinated control strategy of the air charging system is provided, which allows simultaneous adjustment of the actuators and compensate for their interactions. Such a coordinated control strategy proves to be more reliable and requires less calibration effort than conventional control strategies. Moreover, such a coordinated control strategy demonstrates a more accurate response during transients. Thus, a simple, rational and quite inexpensive solution is provided by the coordinated control strategy.

In particular, an embodiment of the present disclosure provides a method of controlling the operation of an air charging system of an internal combustion engine as follows. A plurality of output parameters of the air charging system are monitored. An error between each one of the monitored output parameters and a target value is calculated. Each one of the calculated errors is applied to a linear controller that yields a virtual input which is used to calculate a plurality of input parameters for the air charging system. Each one of the input parameters is used to determine the position of a corresponding actuator of the air charging system. Each one of the actuators are operated according to the determined position thereof. The inputs parameters are calculated with a non-linear mathematical model of the air charging system configured such that each one of the virtual inputs is in a linear relation with only one of the output parameters and vice versa. As a matter of fact, this control strategy provides for controlling the air charging system using a multi-input, multi-output (MIMO) feedback linearization approach, which has the effect of allowing a simultaneous and coordinated control of the actuators while compensating for their interactions.

This coordinated control strategy has good transient response and accuracy and improves the trade-off between engine performance and polluting emissions under any operating conditions. Moreover, being based on a mathematical model of the air charging system, this coordinated control strategy has the additional effect of reducing the calibration efforts.

According to an aspect of the present disclosure, the actuators of the air charging system may include an actuator of an exhaust gas recirculation valve, an actuator of a variable-geometry turbocharger and an actuator of an air intake valve. This aspect of the present disclosure allows a coordinated control of the main actuators of the air charging system.

According to another aspect of the present disclosure, the output parameters of the air charging system may include a parameter indicative of an exhaust manifold pressure, a parameter indicative of an intake manifold pressure and a parameter indicative of a residual gas fraction in the intake manifold. This aspect of the present disclosure allows a reliable implementation of the control strategy when the above identified actuators are involved.

According to another aspect of the present disclosure, the input parameters of the air charging system may include a parameter indicative of an exhaust mass flow rate through the exhaust gas recirculation valve, a parameter indicative of an air mass flow rate through the air intake valve, and a parameter indicative of an exhaust mass flow rate through a turbine of the variable-geometry turbocharger. This aspect of the present disclosure allows a reliable implementation of the control strategy when the above identified actuators and output parameters are involved.

According to another aspect of the present disclosure, the input parameters may be calculated with the following vector equation:

$$\begin{bmatrix} W_{itv} \\ W_{egr} \\ W_{vgt} \end{bmatrix} = \begin{bmatrix} \frac{\gamma R}{V_i} T_{ic} & \frac{\gamma R}{V_i} T_{egr} & 0 \\ 0 & -\frac{\gamma R}{V_x} T_x & -\frac{\gamma R}{V_x} T_x \\ -\frac{F_i}{m_i} & \frac{(F_x - F_i)}{m_i} & 0 \end{bmatrix}^{-1} \cdot \left( \begin{bmatrix} v_1 \\ v_2 \\ v_3 \end{bmatrix} - \begin{bmatrix} -\frac{\gamma R}{V_i} T_i W_{ei} \\ \frac{\gamma R}{V_x} T_{eout} W_{ex} \\ 0 \end{bmatrix} \right)$$

Wherein:
- $W_{itv}$ is the air mass flow rate through the intake valve;
- $W_{egr}$ is the exhaust mass flow rate through the exhaust gas recirculation valve
- $W_{vgt}$ is the exhaust mass flow rate through the turbine of the variable-geometry turbocharger;
- $\gamma$ is a ratio of specific heats;
- R is a universal gas constant;
- $V_i$ is an intake manifold volume;
- $T_{ic}$ is an air temperature in an intake duct downstream of an intercooler;
- $T_i$ is an intake manifold air temperature;
- $T_{egr}$ is a recirculated exhaust gas temperature;
- $T_x$ is an exhaust manifold gas temperature;
- $T_{eout}$ is a temperature of the exhaust gas exiting the engine;
- $V_x$ is an exhaust manifold volume;
- $F_i$ is the residual gas fraction within the intake manifold;
- $F_x$ is a residual gas fraction within the exhaust manifold;
- $m_i$ is the overall mass of gasses within the intake manifold
- $W_{ei}$ is the overall mass flow rate of gasses entering the engine;
- $W_{ex}$ is the overall mass flow rate of gasses exiting the engine;
- $v_1$ is a first virtual input;
- $v_2$ is a second virtual input; and
- $v_3$ is a third virtual input.

This aspect of the present disclosure has the effect of providing a simple and effective solution to calculate the above identified input parameters.

According to another aspect of the present disclosure, the linear controllers may be proportional-integrative controllers or proportional-integrative-derivative controllers. This aspect of the present disclosure has the effect of simplifying the linear control loop within the feedback linearization approach described above.

The method can be carried out with the help of a computer program including a program-code for carrying out all the steps of the method described above, and in the form of a computer program product including the computer program. The method can be also embodied as an electromagnetic signal modulated to carry a sequence of data bits which represent a computer program to carry out all steps of the method.

Another embodiment of the present disclosure provides an electronic control unit for an air charging system of an internal combustion engine, wherein the electronic control unit is configured to monitor a plurality of output parameters of the air charging system, calculate an error between each one of the monitored output parameters and a target value thereof apply each one of the calculated errors to a linear controller that yields a virtual input, use the virtual inputs to calculate a plurality of input parameters for the air charging system, and use each one of the input parameters to determine the position of a corresponding actuator of the air charging system, operate each one of the actuators according the determined position thereof. The electronic control unit is configured to calculate the virtual inputs with a non-linear mathematical model of the air charging system configured such that each one of the virtual inputs is in a linear relation with only one of the output parameters and vice versa.

This embodiment of the present disclosure basically achieves the same effects of the method disclosed above, particularly that of allowing a simultaneous and coordinated control of the actuators while compensating for their interactions.

According to an aspect of the present disclosure, the actuators of the air charging system may include an actuator of an exhaust gas recirculation valve, an actuator of a variable-geometry turbocharger and an actuator of an air intake valve. This aspect of the present disclosure allows a coordinated control of the main actuators of the air charging system.

According to another aspect of the present disclosure, the output parameters of the air charging system may include a parameter indicative of an exhaust manifold pressure, a parameter indicative of an intake manifold pressure and a parameter indicative of a residual gas fraction in the intake manifold. This aspect of the present disclosure allows a reliable implementation of the control strategy when the above identified actuators are involved.

According to another aspect of the present disclosure, the input parameters of the air charging system may include a parameter indicative of an exhaust mass flow rate through the exhaust gas recirculation valve, a parameter indicative of an air mass flow rate through the air intake valve, and a parameter indicative of an exhaust mass flow rate through a turbine of the variable-geometry turbocharger. This aspect of the present disclosure allows a reliable implementation of the control strategy when the above identified actuators and output parameters are involved.

According to another aspect of the present disclosure, the electronic control unit may be configured to calculate the input parameters with the following vector equation:

$$\begin{bmatrix} W_{itv} \\ W_{egr} \\ W_{vgt} \end{bmatrix} = \begin{bmatrix} \frac{\gamma R}{V_i}T_{ic} & \frac{\gamma R}{V_i}T_{egr} & 0 \\ 0 & -\frac{\gamma R}{V_x}T_x & -\frac{\gamma R}{V_x}T_x \\ -\frac{F_i}{m_i} & \frac{(F_x - F_i)}{m_i} & 0 \end{bmatrix}^{-1} \cdot \left( \begin{bmatrix} v_1 \\ v_2 \\ v_3 \end{bmatrix} - \begin{bmatrix} -\frac{\gamma R}{V_i}T_i W_{ei} \\ \frac{\gamma R}{V_x}T_{eout}W_{ex} \\ 0 \end{bmatrix} \right)$$

Wherein:

$W_{itv}$ is the air mass flow rate through the intake valve;
$W_{egr}$ is the exhaust mass flow rate through the exhaust gas recirculation valve
$W_{vgt}$ is the exhaust mass flow rate through the turbine of the variable-geometry turbocharger;
$\gamma$ is a ratio of specific heats;
R is a universal gas constant;
$V_i$ is an intake manifold volume;
$T_{ic}$ is an air temperature in an intake duct downstream of an intercooler;
$T_i$ is an intake manifold air temperature;
$T_{egr}$ is a recirculated exhaust gas temperature;
$T_x$ is an exhaust manifold as temperature;
$T_{eout}$ is a temperature of the exhaust gas exiting the engine;
$V_x$ is an exhaust manifold volume;
$F_i$ is the residual gas fraction within the intake manifold;
$F_x$ is a residual gas fraction within the exhaust manifold;
$m_i$ is the overall mass of gasses within the intake manifold
$W_{ei}$ is the overall mass flow rate of gasses entering the engine;
$W_{ex}$ is the overall mass flow rate of gasses exiting the engine;
$v_1$ is a first virtual input;
$v_2$ is a second virtual input; and
$v_3$ is a third virtual input.

This aspect of the present disclosure has the effect of providing a simple and effective solution to calculate the above identified input parameters.

According to another aspect of the present disclosure, the linear controllers may be proportional-integrative controllers or proportional-integrative-derivative controllers. This aspect of the present disclosure has the effect of simplifying the linear control loop within the feedback linearization approach described above.

Another embodiment of the present disclosure provides an apparatus for controlling the operation of an air charging system of an internal combustion engine, wherein the apparatus includes means for monitoring a plurality of output parameters of the air charging system, means for calculating an error between each one of the monitored output parameters and a target value thereof, means for applying each one of the calculated errors to a linear controller that yields a virtual input, means for using the virtual inputs to calculate a plurality of input parameters for the air charging system, means for using each one of the input parameters to determine the position of a corresponding actuator of the air charging system, and means tier moving each one of the actuators in the determined position thereof. The means for calculating the virtual inputs use a non-linear mathematical model of the air charging system is configured such that each one of the virtual inputs is in a linear relation with only one of the output parameters and vice versa.

This embodiment of the present disclosure basically achieves the same effects of the method disclosed above, particularly that of allowing a simultaneous and coordinated control of the actuators while compensating for their interactions.

According to an aspect of the present disclosure, the actuators of the air charging system may include an actuator of an exhaust gas recirculation valve, an actuator of a variable-geometry turbocharger and an actuator of an air intake valve. This aspect of the present disclosure allows a coordinated control of the main actuators of the air charging system.

According to another aspect of the present disclosure, the output parameters of the air charging system may include a parameter indicative of an exhaust manifold pressure, a parameter indicative of an intake manifold pressure and a parameter indicative of a residual gas fraction in the intake manifold. This aspect of the present disclosure allows a reliable implementation of the control strategy when the above identified actuators are involved.

According to another aspect of the present disclosure, the input parameters of the air charging system may include a parameter indicative of an exhaust mass flow rate through the exhaust gas recirculation valve, a parameter indicative of an air mass flow rate through the air intake valve, and a parameter indicative of an exhaust mass flow rate through a turbine of the variable-geometry turbocharger. This aspect of the present disclosure allows a reliable implementation of the control strategy when the above identified actuators and output parameters are involved.

According to another aspect of the present disclosure, the means for calculating the input parameters may use the following vector equation:

$$\begin{bmatrix} W_{itv} \\ W_{egr} \\ W_{vgt} \end{bmatrix} = \begin{bmatrix} \frac{\gamma R}{V_i}T_{ic} & \frac{\gamma R}{V_i}T_{egr} & 0 \\ 0 & -\frac{\gamma R}{V_x}T_x & -\frac{\gamma R}{V_x}T_x \\ -\frac{F_i}{m_i} & \frac{(F_x - F_i)}{m_i} & 0 \end{bmatrix}^{-1} \cdot \left( \begin{bmatrix} v_1 \\ v_2 \\ v_3 \end{bmatrix} - \begin{bmatrix} -\frac{\gamma R}{V_i}T_i W_{ei} \\ \frac{\gamma R}{V_x}T_{eout}W_{ex} \\ 0 \end{bmatrix} \right)$$

Wherein:

$W_{itv}$ is the air mass flow rate through the intake valve;
$W_{egr}$ is the exhaust mass flow rate through the exhaust gas recirculation valve
$W_{vgt}$ is the exhaust mass flow rate through the turbine of the variable-geometry turbocharger;
$\gamma$ is a ratio of specific heats;
R is a universal gas constant;
$V_i$ is an intake manifold volume;
$T_{ic}$ is an air temperature in an intake duct downstream of an intercooler;
$T_i$ is an intake manifold air temperature;
$T_{egr}$ is a recirculated exhaust gas temperature;
$T_x$ is an exhaust manifold gas temperature;
$T_{eout}$ is a temperature of the exhaust gas exiting the engine;
$V_x$ is an exhaust manifold volume;
$F_i$ is the residual gas fraction within the intake manifold;
$F_x$ is a residual gas fraction within the exhaust manifold;
$m_i$ is the overall mass of gasses within the intake manifold
$W_{ei}$ is the overall mass flow rate of gasses entering the engine;
$W_{ex}$ is the overall mass flow rate of gasses exiting the engine;
$v_1$ is a first virtual input;
$v_2$ is a second virtual input; and
$v_3$ is a third virtual input.

This aspect of the present disclosure has the effect of providing a simple and effective solution to calculate the above identified input parameters.

According to another aspect of the present disclosure, the linear controllers may be proportional-integrative controllers or proportional-integrative-derivative controllers.

This aspect of the present disclosure has the effect of simplifying the linear control loop within the feedback linearization approach described above.

BRIEF DESCRIPTION THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

Figure 1:
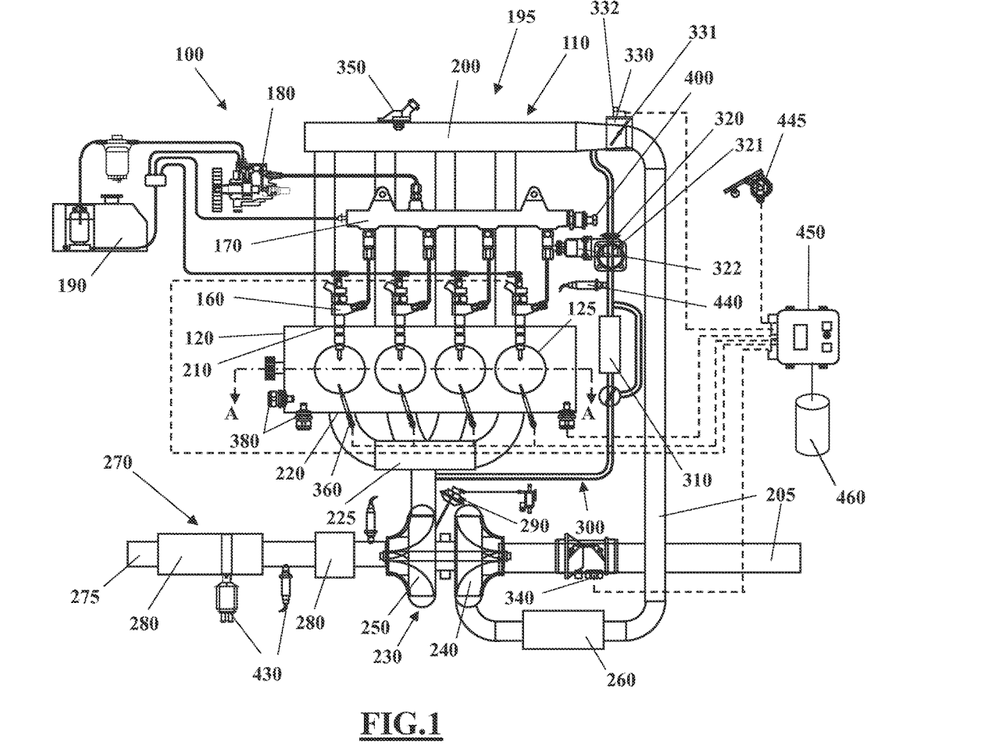
FIG. 1 schematically shows an automotive system.
Figure 2:
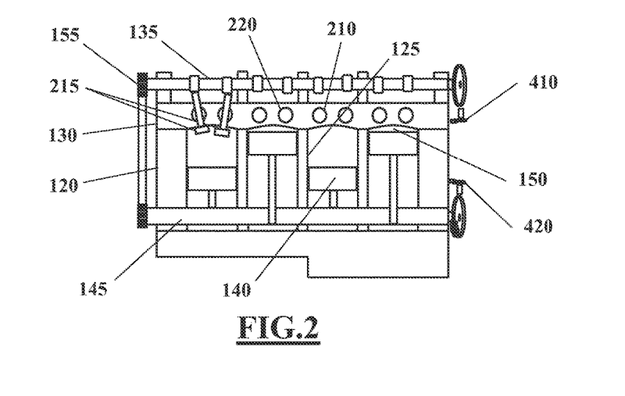
FIG. 2 is section A-A of FIG. 1.

Some embodiments may include an automotive system 100, as shown in FIGS. 1 and 2, which includes an internal combustion engine (ICE) 110, for example a compression-ignition engine (e.g. Diesel) or a spark-ignition engine (e.g. gasoline). The ICE 110 has an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through an exhaust port 220. In some examples, a cam phaser 155 may selectively vary the timing between the camshaft 135 and the crankshaft 145.

The exhaust gasses coming from the combustion chamber 150 are directed into an exhaust system 270. The exhaust system 270 may include an exhaust manifold 225 in fluid communication with the exhaust port(s) 220, which collect the exhaust gasses and directs them into and exhaust pipe 275 having one or more exhaust aftertreatment devices 280.

The aftertreatment devices may be any device configured to change the composition of the exhaust gases. Some examples of aftertreatment devices 280 include, but are not limited to, catalytic converters (two and three way), oxidation catalysts, lean NOx traps, hydrocarbon adsorbers, selective catalytic reduction (SCR) systems, and particulate filters.

The air may be provided to the air intake port(s) 210 through an air charging system 195. The air charging system 195 may include an intake manifold 200 in communication with the air intake port(s) 210. An air intake duct 205 may provide air from the ambient environment to the intake manifold 200. An intake valve 330 may be disposed in the intake duct 205. The intake valve 330 may include a movable valve member 331, for example a throttle body, and an electrical actuator 332 that moves the valve member 331 to regulate the flow of air into the manifold 200.

The air charging system 195 may also include a variable-geometry turbocharger 230, having a compressor 240 rotationally coupled to a turbine 250, wherein the compressor is located in the intake duct 205 and the turbine in the exhaust pipe 275. Rotation of the compressor 240 increases the pressure and temperature of the air in the intake duct 205 and manifold 200. An intercooler 260, disposed in the intake duct 205 between the compressor 240 and the intake manifold 200, may reduce the temperature of the air. The turbine 250 rotates by receiving exhaust gases from the exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes to alter the flow of the exhaust gases through the turbine 250.

The air charging system 195 may further include an exhaust gas recirculation (EGR) pipe 300 coupled between the exhaust manifold 225 and the intake manifold 200. The EGR pipe 300 may be provided with an EGR cooler 310 to reduce the temperature of the exhaust gases flowing therein. An EGR valve 320 may be disposed in the EGR pipe 300. The EGR valve 320 may include a movable valve member 321 and an electrical actuator 322 that moves the valve member 321 to regulate a flow of exhaust gases in the EGR pipe 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the intake valve actuator 332, the EGR Valve actuator 322, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or a non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The tangible storage medium is then a non-transitory computer readable medium, such that the computer program code is permanently or non-permanently stored in a retrievable way in or on this storage medium. The storage medium can be of conventional type known in computer technology such as a flash memory, an aisle, a CD or the like.

Instead of an ECU 450, the automotive system 100 may have a different type of processor to provide the electronic logic, e.g. an embedded controller, an onboard computer, or any processing module that might be deployed in the vehicle.

In greater details, the ECU 450 may be configured to control the intake valve actuator 332, the EGR valve actuator 322 and the VGT actuator 290 using a feedback linearization approach. This feedback linearization approach may be based on a multi-input-multi-output (MIMO) non-linear mathematical model of the air charging system 195 described above.

The input parameters of the air charging system 195 may include a parameter $W_{itv}$ indicative of the air mass flow rate through the intake valve 330, a parameter $W_{egr}$ indicative of the exhaust mass flow rate through the EGR valve 320, and a parameter $W_{vgt}$ indicative of the exhaust mass flow rate through the turbine 250 of the variable-geometry turbocharger 230. The output parameters of the air charging system 195 may include a parameter $p_x$ indicative of an exhaust manifold pressure, a parameter $p_i$ indicative of an intake manifold pressure and a parameter $F_i$ indicative of a residual gas fraction in the intake manifold 200.

The MIMO non-linear mathematical model of the air charging system 195 may be defined by the following equations:

$$\dot{p}_i = \frac{dp_i}{dt} = \frac{\gamma R}{V_i}(W_{itv}T_{ic} + W_{egr}T_{egr} - W_{ei}T_i)$$

$$\dot{p}_x = \frac{dp_x}{dt} = \frac{\gamma R}{V_x}(W_{ex}T_{eout} - W_{egr}T_x - W_{vgt}T_x)$$

$$\dot{F}_i = \frac{dF_i}{dt} = \frac{(F_x - F_i)W_{egr} - F_i W_{itv}}{m_i}$$

Wherein:
- $\gamma$ is the ratio of specific heats;
- R is the universal gas constant;
- $V_i$ is an intake manifold inner volume;
- $T_{ic}$ is an air temperature in the intake duct 205 downstream of the intercooler 260;
- $T_i$ is an air temperature within the intake manifold 200;
- $T_{egr}$ is a recirculated exhaust gas temperature;
- $T_x$ is an exhaust gas temperature within the exhaust manifold 225;
- $T_{eout}$ is a temperature of the exhaust gas exiting the ICE 110;
- $V_x$ is an exhaust manifold volume;
- $F_x$ is a residual gas fraction within the exhaust manifold 225;
- $m_i$ is the overall mass of gasses within the intake manifold 200;
- $W_{ei}$ is the overall mass flow rate of gasses entering the engine 110;
- $W_{ex}$ is the overall mass flow rate of gasses exiting the engine 110.

The MIMO non-linear mathematical model of the air charging system 195 may be equally defined by the following vector equation:

$$\begin{bmatrix} \dot{p}_i \\ \dot{p}_x \\ \dot{F}_i \end{bmatrix} = \begin{bmatrix} \frac{\gamma R}{V_i}(W_{itv}T_{ic} + W_{egr}T_{egr} - W_{ei}T_i) \\ \frac{\gamma R}{V_x}(W_{ex}T_{eout} - W_{egr}T_x - W_{vgt}T_x) \\ \frac{(F_x - F_i)W_{egr} - F_i W_{itv}}{m_i} \end{bmatrix} =$$

$$\begin{bmatrix} -\frac{\gamma R}{V_i}T_i W_{ei} \\ \frac{\gamma R}{V_x}T_{eout}W_{ex} \\ 0 \end{bmatrix} + \begin{bmatrix} \frac{\gamma R}{V_i}T_{ic} & \frac{\gamma R}{V_i}T_{egr} & 0 \\ 0 & -\frac{\gamma R}{V_x}T_x & -\frac{\gamma R}{V_x}T_x \\ -\frac{F_i}{m_i} & \frac{(F_x - F_i)}{m_i} & 0 \end{bmatrix} \cdot \begin{bmatrix} W_{itv} \\ W_{egr} \\ W_{vgt} \end{bmatrix}.$$

Defining an output vector $y$ as:

$$y = \begin{bmatrix} p_i \\ p_x \\ F_i \end{bmatrix}$$

an input vector $u$ as:

$$u = \begin{bmatrix} W_{itv} \\ W_{egr} \\ W_{vgt} \end{bmatrix}$$

a first vector function ƒ(x) as:

$$f(x) = \begin{bmatrix} -\frac{\gamma R}{V_i} T_i W_{ei} \\ \frac{\gamma R}{V_x} T_{eout} W_{ex} \\ 0 \end{bmatrix}$$

and a second vector function g(x) as:

$$g(x) = \begin{bmatrix} \frac{\gamma R}{V_i} T_{ic} & \frac{\gamma R}{V_i} T_{egr} & 0 \\ 0 & -\frac{\gamma R}{V_x} T_x & -\frac{\gamma R}{V_x} T_x \\ -\frac{F_i}{m_i} & \frac{(F_x - F_i)}{m_i} & 0 \end{bmatrix}$$

the vector equation above may be rewritten as follows:

$$\dot{y} = f(x) + g(x) \cdot u$$

where x generically indicates the state vector.

As a consequence, it is possible to define a vector v of virtual inputs:

$$v = \begin{bmatrix} v_1 \\ v_2 \\ v_3 \end{bmatrix}$$

and use this virtual input vector v to develop a vector u according to the following vector equation:

$$u = g(x)^{-1} \cdot (v - f(x))$$

such that:

$$\dot{y} = v$$

These vector equations may be represented in explicit form as:

$$u = \begin{bmatrix} W_{itv} \\ W_{egr} \\ W_{vgt} \end{bmatrix} = \begin{bmatrix} \frac{\gamma R}{V_i} T_{ic} & \frac{\gamma R}{V_i} T_{egr} & 0 \\ 0 & -\frac{\gamma R}{V_x} T_x & -\frac{\gamma R}{V_x} T_x \\ -\frac{F_i}{m_i} & \frac{(F_x - F_i)}{m_i} & 0 \end{bmatrix}^{-1} \cdot \left( \begin{bmatrix} v_1 \\ v_2 \\ v_3 \end{bmatrix} - \begin{bmatrix} -\frac{\gamma R}{V_i} T_i W_{ei} \\ \frac{\gamma R}{V_x} T_{eout} W_{ex} \\ 0 \end{bmatrix} \right)$$

and $$\dot{y} = \begin{bmatrix} \dot{p}_i \\ \dot{p}_x \\ \dot{F}_i \end{bmatrix} = \begin{bmatrix} v_1 \\ v_2 \\ v_3 \end{bmatrix} = v$$

As a matter of fact, the MIMO non-linear mathematical system has been transformed in an equivalent linear system, where each one of the virtual inputs $v_1$, $v_2$ and $v_3$ is related to only one of the output parameters $\dot{p}_i$, $\dot{p}_x$ and $\dot{F}_i$ and vice versa, and where the relation between each one of the virtual inputs and the respective output parameter is a linear relation.

Figure 3:
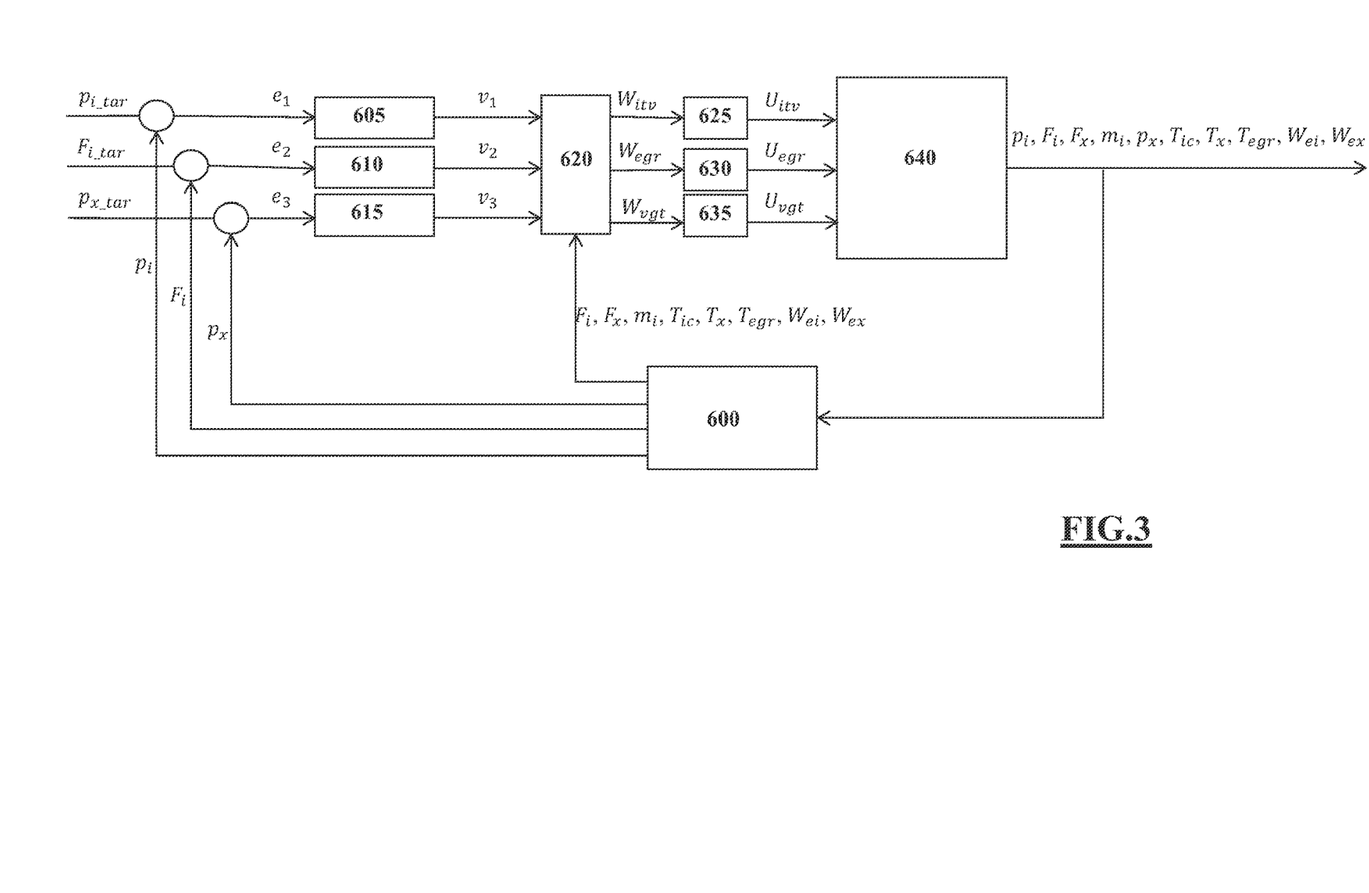
FIG. 3 is a flowchart representing a control strategy for an air charging system of the automotive system of FIG. 1.

Taking effect of this transformation, the ECU 450 may be configured to control the intake valve actuator 332, the EGR valve actuator 322 and the VGT actuator 290 during the operation of the ICE 110, by means of the linear control procedure as illustrated in FIG. 3.

This control procedure provides for the ECU 450 to monitor (block 600) the output parameters of the air charging system 195, namely the exhaust manifold pressure $p_x$, the intake manifold pressure $p_i$ and the residual gas fraction $F_i$ in the intake manifold 200, along with the other observable status of the system involved in the MIMO non-linear mathematical model above, namely the intake manifold air temperature $T_i$, the air temperature $T_{ic}$ in the intake duct 205 downstream of the intercooler 260, the recirculated exhaust gas temperature $T_{egr}$, the exhaust manifold gas temperature $T_x$, the engine out exhaust gas temperature $T_{eout}$, the residual gas fraction $F_x$ in the exhaust manifold 225, the overall mass $m_i$ at the intake manifold 200, the overall mass flow rate $W_{ei}$ entering the engine 110 and the overall mass flow rate $W_{ex}$ exiting the engine 110.

In this regard, the exhaust manifold pressure $p_x$ may be measured by means of a pressure sensor (not shown) that may be disposed in the exhaust manifold 225 or in the exhaust pipe 275 upstream of the turbine 250. As an alternative, this parameter may be estimated on the basis of other measurable operating parameters of the ICE 110, for example on the basis of the measurements made by the exhaust pressure and temperature sensors 430. The intake manifold pressure $p_i$ may be measured by means of the manifold pressure and temperature sensor 350 located in the intake manifold 200. The residual gas fraction $F_i$ may be calculated as a function of an oxygen concentration $O_2$ within the intake manifold 200, according to the equation:

$$F_i = 1 - O_2$$

The oxygen concentration $O_2$ may be measured by means of a dedicated sensor (not shown) disposed in the intake manifold 200 or may be estimated on the basis of other measurable operating parameters of the ICE 110. The intake manifold air temperature $T_{ic}$ may be measured (downstream of the intercooler 260) by means of the manifold pressure and temperature sensor 350 located in the intake manifold 200. The recirculated exhaust gas temperature $T_{egr}$ may be measured by means of the EGR temperature sensor 440. The exhaust manifold gas temperature $T_x$ may be measured by means of a temperature sensor (not shown) that may be disposed in the exhaust manifold 225 or in the exhaust pipe 275 upstream of the turbine 250. As an alternative, this parameter may be estimated on the basis of other measurable operating parameters of the ICE 110, for example on the basis of the measurements made by the exhaust pressure and temperature sensors 430. The residual gas fraction $F_x$ at the exhaust manifold 225 may be measured by means of a lambda sensor (not shown) located in the exhaust pipe 275, upstream of the aftertreatment devices 280. The overall mass $m_i$ at the intake manifold 200, the overall mass flow rate $W_{ei}$ entering the engine 110 and the overall mass flow rate $W_{ex}$ exiting the engine 110, may be measured or estimated with the aid of the mass airflow and temperature sensor 340.

Coming back to the control procedure, the monitored output parameters $p_i$, $F_i$ and $p_x$, are fed back and used to calculate an error $e_1$, $e_2$ and $e_3$ between each one of them and a corresponding target value $p_{i\_tar}$, $F_{i\_tar}$ and $p_{x\_tar}$:

$$e_1 = p_{i\_tar} - p_i$$

$$e_2 = F_{i\_tar} - F_i$$

$$e_3 = p_{x\_tar} - p_x$$

The target values $p_{i\_tar}$, $p_{x\_tar}$ and $F_{i\_tar}$ for the output parameters may be determined by the ECU 450 on the basis of other conventional strategies, for example on the basis of the engine operating point.

The first error $e_1$ is then applied as input to a first single-input single-output (SISO) linear controller 605 that yields as output a corresponding value for the first virtual input $v_1$. The second error $e_2$ is applied as input to a second SISO linear controller 610 that yields as output a corresponding value for the second virtual input $v_2$. The third error $e_3$ is applied as input to a third SISO linear controller 615 that yields as output a corresponding value for the third virtual input $v_3$.

The three linear controller 605, 610 and 615 may be for example proportional-integrative (PI) controllers or proportional-integrative-differential (PID) controllers, and are tuned over the equivalent linear system explained above, such as to minimize the respective errors $e_1$, $e_2$ and $e_3$.

The three virtual inputs $v_1$, $v_2$ and $v_3$ are then applied to a non-linear calculation module 620, where they are used to calculate corresponding values for the input parameters $W_{itv}$, $W_{egr}$ and $W_{vgt}$ of the air charging system 195. In particular, the calculation module 620 may calculate these input parameters with the equations that have been previously explained:

$$\begin{bmatrix} W_{itv} \\ W_{egr} \\ W_{vgt} \end{bmatrix} = \begin{bmatrix} \frac{\gamma R}{V_i}T_{ic} & \frac{\gamma R}{V_i}T_{egr} & 0 \\ 0 & -\frac{\gamma R}{V_x}T_x & -\frac{\gamma R}{V_x}T_x \\ -\frac{F_i}{m_i} & \frac{(F_x - F_i)}{m_i} & 0 \end{bmatrix}^{-1} \cdot \left( \begin{bmatrix} v_1 \\ v_2 \\ v_3 \end{bmatrix} - \begin{bmatrix} -\frac{\gamma R}{V_i}T_i W_{ei} \\ \frac{\gamma R}{V_x}T_{eout}W_{ex} \\ 0 \end{bmatrix} \right)$$

The calculated value of the air mass flow rate $W_{itv}$ is applied to a calculation module 625, which may use a mathematical model of the intake valve 330 to yield as output a position $U_{itv}$ of the actuator 332, which corresponds to the calculated value of the air mass flow rate $W_{itv}$. The calculated value of the exhaust mass flow rate $W_{egr}$ is applied to another calculation module 630, which may use a mathematical model of the EGR valve 320 to yield as output a position $U_{egr}$ of the actuator 322, which corresponds to said calculated value of the exhaust mass flow rate $W_{egr}$. The calculated value of the exhaust mass flow rate $W_{vgt}$ is applied to still another calculation module 635, which may use a mathematical model of the turbine 250 to yield as output a position $U_{vgt}$ of the actuator 290, which corresponds to said calculated value of the exhaust mass flow rate $W_{vgt}$.

The air intake valve actuator 332, the EGR valve actuator 322 and the VGT actuator 290 are finally operated according to the respective calculated position $U_{itv}$, $U_{egr}$ and $U_{vgt}$ (block 640).

As a result of this solution, the intake valve actuator 332, the EGR valve actuator 322 and the VGT actuator 290 are always controlled together in a coordinate way, thereby improving the accuracy and the time response with which the air charging system 195 adheres to the target values $p_{i\_tar}$, $p_{x\_tar}$ and $F_{i\_tar}$ for the output parameters, particularly during the transients.

Figure 4:
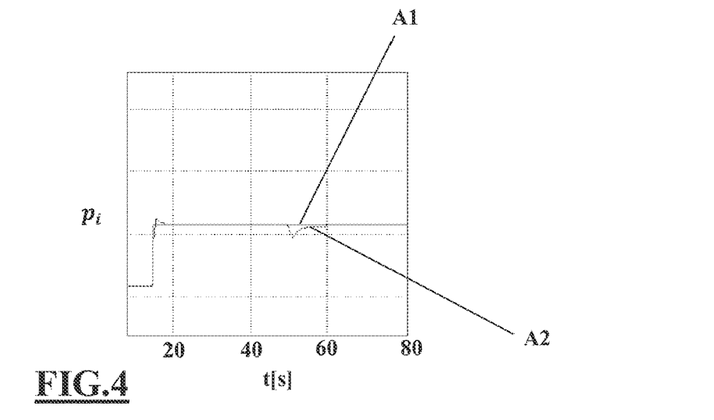
FIG. 4 is a graph that show the variation over the time of the intake manifold pressure during an explanatory operating phase of the air charging system.
Figure 5:
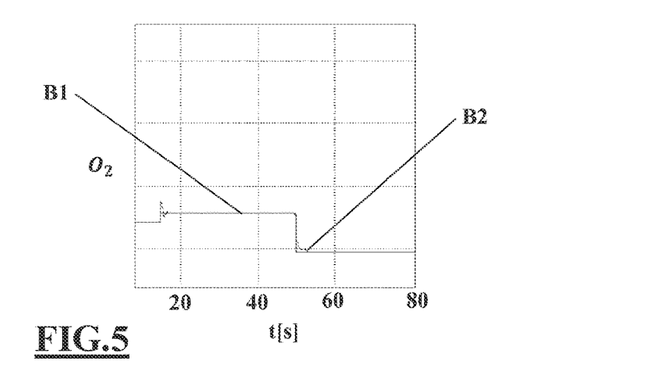
FIG. 5 is a graph that show the variation over the time of the exhaust manifold pressure during the explanatory operating phase of the air charging system.
Figure 6:
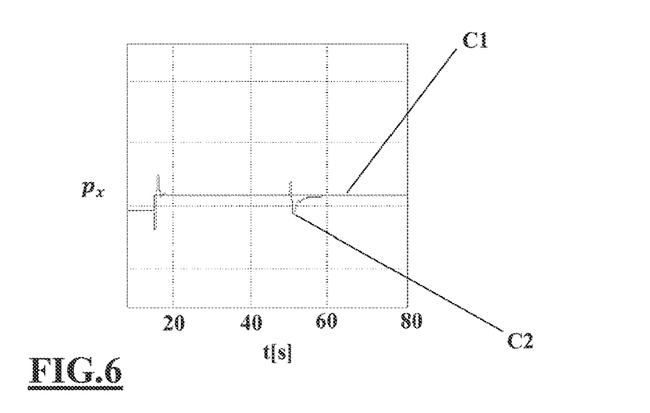
FIG. 6 is a graph that show the variation over the time of the residual gas fraction in the intake manifold, during the explanatory operating phase of the air charging system.

An example of this effect can be appreciated by comparing the graphs of FIGS. 4, 5 and 6. Considering the time window between 40 and 60 seconds, the target values $p_{i\_tar}$ for the intake pressure (line A1 in FIG. 4) and the target value $F_{i\_tar}$ for the residual gas fraction (quantified in term of oxygen concentration $O_2$ and indicated by the line C1 in FIG. 6) are kept constant, while the target value $p_{i\_tar}$ for the exhaust pressure (line B1 in FIG. 5) is instantaneously varied. Thanks to the control strategy detailed above, when this variation occurs, the real value of the exhaust pressure $p_x$ (line B2 in FIG. 5) reaches and adheres fast to the new target value $p_{x\_tar}$. The real value of the intake pressure $p_i$ (line A2 in FIG. 4) and the real value of the residual gas fraction $F_i$ (line C2 in FIG. 6) show a little spike, but they return fast to their respective target values $p_{i\_tar}$ and $F_{i\_tar}$.

The accuracy of this control strategy has the additional effect of improving the trade-off between engine performance and polluting emissions under any engine operating conditions. Moreover, the mathematical model on which the control strategy is based allows a reduction of the calibration activities.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method of controlling the operation of an air charging system of an internal combustion engine comprising: providing a plurality of actuators in the air charging system, including a first actuator that controls intake air, a second actuator that controls exhaust gas recirculation flow and a third actuator that controls positioning of turbine vanes; determining an output parameter for each of the plurality of actuators in the air charging system; calculating, by an electronic control unit, an error between each one of the plurality of output parameters and a target value thereof; applying, by the electronic control unit, each one of the calculated errors to a separate one of a plurality of linear controllers to yield a virtual input from each one of the errors; calculating simultaneously, by a non-linear calculation module of the electronic control unit, a plurality of input parameters for the air charging system using the virtual inputs; determining, by the electronic control unit, a position for each actuator of the air charging system using a respective one of the input parameters in a mathematical model of the respective actuator; and operating, by the electronic control unit, the first second and third actuators according to the determined position thereof, including: controlling, via the electronic control unit, the first, second and third actuators together in coordination to reduce a time response within which the air charging system adheres to the target values; and simultaneously moving the first, second and third actuators; and setting each of the first, second and third actuators to its respective determined position; wherein each one of the virtual inputs is in a linear relation with only one of the output parameters; wherein the output parameters include an intake pressure, a residual gas fraction and an exhaust manifold pressure and comprising: maintaining constant, the target value for the intake pressure; maintaining constant, the target value for the residual gas fraction; and instantaneously varying the target value for the exhaust manifold pressure.

2. The method according to claim 1, wherein the output parameters of the air charging system comprise a parameter indicative of an exhaust manifold pressure, a parameter indicative of an intake manifold pressure and a parameter indicative of an oxygen concentration in the intake manifold.

3. The method according to claim 2, wherein the input parameters of the air charging system comprise a parameter indicative of an exhaust mass flow rate through the exhaust gas recirculation valve, a parameter indicative of an air mass flow rate through the air intake valve, and a parameter indicative of an exhaust mass flow rate through a turbine of the variable-geometry turbocharger.

4. The method according to claim 3, wherein the input parameters are calculated simultaneously in the non-linear calculation module, with the following vector relation:

$$\begin{bmatrix} W_{itv} \\ W_{egr} \\ W_{vgt} \end{bmatrix} = \begin{bmatrix} \frac{\gamma R}{V_i} T_{ic} & \frac{\gamma R}{V_i} T_{egr} & 0 \\ 0 & -\frac{\gamma R}{V_x} T_x & -\frac{\gamma R}{V_x} T_x \\ -\frac{F_i}{m_i} & \frac{(F_x - F_i)}{m_i} & 0 \end{bmatrix}^{-1} \cdot \left( \begin{bmatrix} v_1 \\ v_2 \\ v_3 \end{bmatrix} - \begin{bmatrix} -\frac{\gamma R}{V_i} T_i W_{ei} \\ \frac{\gamma R}{V_x} T_{eout} W_{ex} \\ 0 \end{bmatrix} \right)$$

Wherein:
$W_{itv}$ is an air mass flow rate through the intake valve;
$W_{egr}$ is an exhaust mass flow rate through the exhaust gas recirculation valve;
$W_{vgt}$ is an exhaust mass flow rate through the turbine of the variable-geometry turbocharger;
$\gamma$ is a ratio of specific heats;
R is a universal gas constant;
$V_i$ is an intake manifold volume;
$T_{ic}$ is an air temperature in an intake duct downstream of an intercooler;
$T_i$ is an intake manifold air temperature;
$T_{egr}$ is a recirculated exhaust gas temperature;
$T_x$ is an exhaust manifold gas temperature;
$T_{eout}$ is a temperature of exhaust gas exiting the engine;
$V_x$ is an exhaust manifold volume;
$F_i$ is a residual gas fraction within an intake manifold;
$F_x$ is a residual gas fraction within an exhaust manifold;
$m_i$ is an overall mass of gasses within the intake manifold;
$W_{ei}$ is an overall mass flow rate of gasses entering the engine;
$W_{ex}$ is an overall mass flow rate of gasses exiting the engine;
$v_1$ is a first virtual input;
$v_2$ is a second virtual input; and
$v_3$ is a third virtual input.

5. The method according to claim 1, wherein the linear controllers are selected from the group consisting of a proportional-integrative controller and a proportional-integrative-derivative controller.

6. A computer program stored on a non-transitory computer-readable medium comprising a computer code suitable for performing the method according claim 1.

7. An air charging system of an internal combustion engine comprising: a plurality of actuators controlling a plurality of output parameters of the air charging system, including a first actuator configured to operate an exhaust gas recirculation valve, a second actuator configured to operate a variable-geometry turbocharger and a third actuator configured to operate an air intake valve; a plurality of sensors configured to generate signals for the output parameters; and an electronic control unit configured to: monitor the output parameters of the air charging system through the plurality of sensors; calculate an error between each one of the monitored output parameters and a target value thereof; apply each one of the calculated errors to a separate one of a plurality of linear controllers that yields a virtual input calculated with a non-linear mathematical model of the air charging system; use the virtual inputs to calculate simultaneously in a non-linear calculation module, a plurality of input parameters for the air charging system; use each one of the input parameters to determine a position of a corresponding actuator of the air charging system; operate each one of the actuators according the determined position thereof; control the first, second and third actuators together in coordination to reduce a time response within which the air charging system adheres to the target values; simultaneously move the first, second and third actuators; and set each of the first, second and third actuators to its respective determined position; wherein each one of the virtual inputs is in a linear relation with only one of the output parameters; wherein the output parameters include an intake pressure, a residual gas fraction and an exhaust manifold pressure and comprising: maintaining constant, the target value for the intake pressure; maintaining constant, the target value for the residual gas fraction; and instantaneously varying the target value for the exhaust manifold pressure.

8. The air charging system according to claim 7, wherein the controller is configured to set the position of each of the actuators directly to its determined position.

9. The air charging system according to claim 8, wherein the output parameters of the air charging system comprise a parameter indicative of an exhaust manifold pressure, a parameter indicative of an intake manifold pressure and a parameter indicative of an oxygen concentration in the intake manifold.

10. The air charging system according to claim 9, wherein the input parameters of the air charging system comprise a parameter indicative of an exhaust mass flow rate through the exhaust gas recirculation valve, a parameter indicative of an air mass flow rate through the air intake valve, and a parameter indicative of an exhaust mass flow rate through a turbine of the variable-geometry turbocharger.

11. The air charging system according to claim 10, wherein the input parameters are calculated simultaneously in the non-linear calculation module, with the following vector relation:

$$\begin{bmatrix} W_{itv} \\ W_{egr} \\ W_{vgt} \end{bmatrix} = \begin{bmatrix} \frac{\gamma R}{V_i} T_{ic} & \frac{\gamma R}{V_i} T_{egr} & 0 \\ 0 & -\frac{\gamma R}{V_x} T_x & -\frac{\gamma R}{V_x} T_x \\ -\frac{F_i}{m_i} & \frac{(F_x - F_i)}{m_i} & 0 \end{bmatrix}^{-1} \cdot \left( \begin{bmatrix} v_1 \\ v_2 \\ v_3 \end{bmatrix} - \begin{bmatrix} -\frac{\gamma R}{V_i} T_i W_{ei} \\ \frac{\gamma R}{V_x} T_{eout} W_{ex} \\ 0 \end{bmatrix} \right)$$

Wherein:
$W_{itv}$ is an air mass flow rate through the intake valve (330);
$W_{egr}$ is an exhaust mass flow rate through the exhaust gas recirculation valve (320);
$W_{vgt}$ is an exhaust mass flow rate through the turbine (250) of the variable-geometry turbocharger (230);
$\gamma$ is a ratio of specific heats;
R is a universal gas constant;
$V_i$ is an intake manifold volume;

$T_{ic}$ is an air temperature in an intake duct (205) downstream of an intercooler (260);
$T_i$ is an intake manifold air temperature;
$T_{egr}$ is a recirculated exhaust gas temperature;
$T_x$ is an exhaust manifold gas temperature;
$T_{eout}$ is a temperature of exhaust gas exiting the engine (110);
$V_x$ is an exhaust manifold volume;
$F_i$ is a residual gas fraction within an intake manifold (200);
$F_x$ is a residual gas fraction within an exhaust manifold (225);
$m_i$ is an overall mass of gasses within the intake manifold (200);
$W_{ei}$ is an overall mass flow rate of gasses entering the engine;
$W_{ex}$ is an overall mass flow rate of gasses exiting the engine (110);
$v_1$ is a first virtual input;
$v_2$ is a second virtual input; and
$v_3$ is a third virtual input.

12. The air charging system according to claim 7, wherein the linear controllers are selected from the group consisting of a proportional-integrative controller and a proportional-integrative-derivative controller.

13. The air charging system according to claim 7 wherein the plurality of actuators comprise:
an exhaust gas recirculation valve actuator;
a variable-geometry turbocharger actuator; and
an air intake valve actuator; wherein the exhaust gas recirculation valve actuator, the variable-geometry turbocharger actuator and the air intake valve actuator are operated by the electronic control unit together and coordinated to simultaneously obtain the target values of the output parameters.

14. The air charging system according to claim 7 comprising:
an intake valve in the air charging system to regulate air flow;
an exhaust gas recirculation valve in the air charging system to regulate exhaust gas flow; and
a turbine with a variable geometry turbine actuator to alter exhaust gas flow through the turbine;
wherein the electronic control unit comprises:
a first linear controller corresponding to the intake valve;
a second linear controller corresponding to the exhaust gas recirculation valve;
a third linear controller corresponding to the turbine;
a non-linear calculation module configured to calculate the input parameters;
a first calculation module with a math model of the intake valve;
a second calculation module with a math model of the exhaust gas recirculation valve;
a third calculation module with a math model of the turbine; and
a control block configured to operate the intake valve, the exhaust gas recirculation valve and the variable geometry turbine actuator.

15. The air charging system according to claim 7 comprising:
an intake system with an intake valve;
an exhaust system with an exhaust gas recirculation valve, a turbocharger with a variable geometry turbine;
an intake valve actuator in the intake system, controlling an intake pressure output parameter that is indicative of an intake system pressure;
an exhaust gas recirculation valve actuator in the exhaust system, controlling an exhaust pressure output parameter that is indicative of an exhaust system pressure;
a variable geometry turbine actuator in the turbocharger, controlling a gas fraction output parameter that is indicative of a gas fraction in the intake system;
wherein the plurality of sensors include:
a first sensor configured to generate a first signal for determining the intake pressure output parameter;
a second sensor configured to generate a second signal for determining the exhaust pressure output parameter; and
a third sensor configured to generate a third signal for determining the gas fraction output parameter;
wherein the electronic control unit is configured to:
monitor the output parameters of the air charging system through the first, second and third sensors;
monitor an overall mass flow rate entering the engine;
monitor an overall mass flow rate exiting the engine;
calculate a first error between the intake pressure output parameter and a target intake pressure value;
calculate a second error between the exhaust pressure output parameter and a target exhaust pressure value;
calculate a third error between the gas fraction output parameter and a target gas fraction value;
apply the first error to a first linear controller that yields a first virtual input that is proportional to the first error;
apply the second error to a second linear controller that yields a second virtual input that is proportional to the second error;
apply the third error to a third linear controller that yields a third virtual input that is proportional to the third error;
use the first, second and third virtual inputs to simultaneously calculate, in a non-linear calculation module, an air mass flow rate input parameter, a first exhaust mass flow rate input parameter, and a second exhaust mass flow rate input parameter, wherein the air mass flow rate input parameter represents air mass flow through the intake valve, the first exhaust mass flow rate input parameter represents exhaust mass flow through the exhaust gas recirculation valve, and the second exhaust mass flow rate input parameter represents exhaust mass flow rate through the variable geometry turbine;
use the air mass flow rate input parameter to determine a first output position of the intake valve actuator in a first calculation module that includes a first mathematical model representing the intake valve;
use the first exhaust mass flow rate input parameter to determine a second output position of the exhaust gas recirculation valve actuator in a second calculation module that includes a second mathematical model representing the exhaust gas recirculation valve;
use the second exhaust mass flow rate input parameter to determine a third output position of the variable geometry turbine actuator in a third calculation module that includes a third mathematical model representing the variable geometry turbine; and operate together and in coordination, through a control block, the intake valve actuator, the exhaust gas recirculation valve actuator and the variable geometry turbine actuator;

wherein the air charging system is transformed into an equivalent linear system, where each of the first, second and third virtual inputs is related to only one of the output parameters.

\* \* \* \* \*